United States Patent
Yu et al.

(10) Patent No.: US 10,541,445 B2
(45) Date of Patent: Jan. 21, 2020

(54) NON-AQUEOUS ELECTROLYTE SOLUTION FOR LITHIUM SECONDARY BATTERY AND LITHIUM SECONDARY BATTERY COMPRISING THE SAME

(71) Applicant: LG Chem, Ltd., Seoul (KR)

(72) Inventors: Sung Hoon Yu, Daejeon (KR); Yoo Sun Kang, Daejeon (KR); Kyung Mi Lee, Daejeon (KR)

(73) Assignee: LG Chem, Ltd. (KR)

( * ) Notice: Subject to any disclaimer, the term of this patent is extended or adjusted under 35 U.S.C. 154(b) by 180 days.

(21) Appl. No.: 15/332,273

(22) Filed: Oct. 24, 2016

(65) Prior Publication Data

US 2017/0125845 A1    May 4, 2017

(30) Foreign Application Priority Data

Oct. 29, 2015  (KR) .................. 10-2015-0150732

(51) Int. Cl.
| | | |
|---|---|---|
| *H01M 10/0567* | (2010.01) | |
| *H01M 10/0568* | (2010.01) | |
| *H01M 10/0569* | (2010.01) | |
| *H01M 10/0525* | (2010.01) | |

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0037* (2013.01)

(58) Field of Classification Search
CPC ........... H01M 10/0567; H01M 10/052; H01M 10/0525; H01M 10/0568; H01M 10/0569; H01M 2300/0037
See application file for complete search history.

(56) References Cited

U.S. PATENT DOCUMENTS

| 8,697,295 B2* | 4/2014 | Fujii ................. H01M 10/0525 |
| | | 429/339 |
| 9,979,049 B2 | 5/2018 | Kim et al. | |
| 2006/0035144 A1* | 2/2006 | Shimizu ............ H01M 10/0525 |
| | | 429/188 |
| 2008/0248397 A1* | 10/2008 | Jung ..................... H01M 4/525 |
| | | 429/314 |
| 2011/0229770 A1* | 9/2011 | Yun ..................... H01M 10/052 |
| | | 429/326 |
| 2014/0322596 A1* | 10/2014 | Shatunov .......... H01M 10/0567 |
| | | 429/188 |
| 2016/0301103 A1* | 10/2016 | Kim ..................... H01M 10/052 |
| 2017/0346127 A1* | 11/2017 | Zhang ..................... H01M 4/62 |

FOREIGN PATENT DOCUMENTS

| GB | 900358 A | * | 7/1962 | ........... C07C 255/45 |
| KR | 101212203 B1 | | 12/2012 | |
| SU | 1177292 A | * | 9/1985 | ........... C07C 121/28 |
| WO | 2015088052 A1 | | 6/2015 | |

OTHER PUBLICATIONS

V. M. Anisimov, A. B. Zoiotoi, M. Y. Antipin, P. M. Lukin, O. E. Nasakin, Y. T. Struchkov. Hexacyanocyclopropane. Synthesis and Structure, Mendeleev Commun., 1992, 2(1), 24-25.*

S. Banerjee. The remarkable catalytic activity of ultra-small free-CeO2 nanoparticles in selective carbon-carbon bond formation reactions in water at room temperature, New J.Chem., 2015, 39, 5350.*

G. W. Griffin, J. E. Basinski, and L. I. Peterson. The Chemistry of Photodimers of Maleic and Fumaric Acid Derivatives. III. cis,trans,cis-1,2,3,4-Tetracyanocyclobutane; Possible Precursors for Tetramethylenecyclobutane, J. Am. Chem. Soc.1962, 84, 6, 1012-1015.*

* cited by examiner

*Primary Examiner* — Carlos Barcena
(74) *Attorney, Agent, or Firm* — Lerner, David, Littenberg, Krumholz & Mentlik, LLP

(57) ABSTRACT

The present invention relates to an additive for a non-aqueous electrolyte solution including a compound represented by Formula 1 below, a non-aqueous electrolyte solution for a lithium secondary battery including the same, and a lithium secondary battery including the non-aqueous electrolyte solution.

$$NC-(R)_n-CN \quad \text{[Formula 1]}$$

(in Formula 1,
R is a cycloalkylene group having 3 to 6 carbon atoms in which at least one cyano group (—CN) is substituted or unsubstituted, a haloalkylene group having 2 to 5 carbon atoms in which at least one cyano group (—CN) is substituted or unsubstituted, or an alkylene group having 2 to 5 carbon atoms in which at least one cyano group (—CN) is substituted, and n is an integer of 1 to 5.)

8 Claims, 1 Drawing Sheet

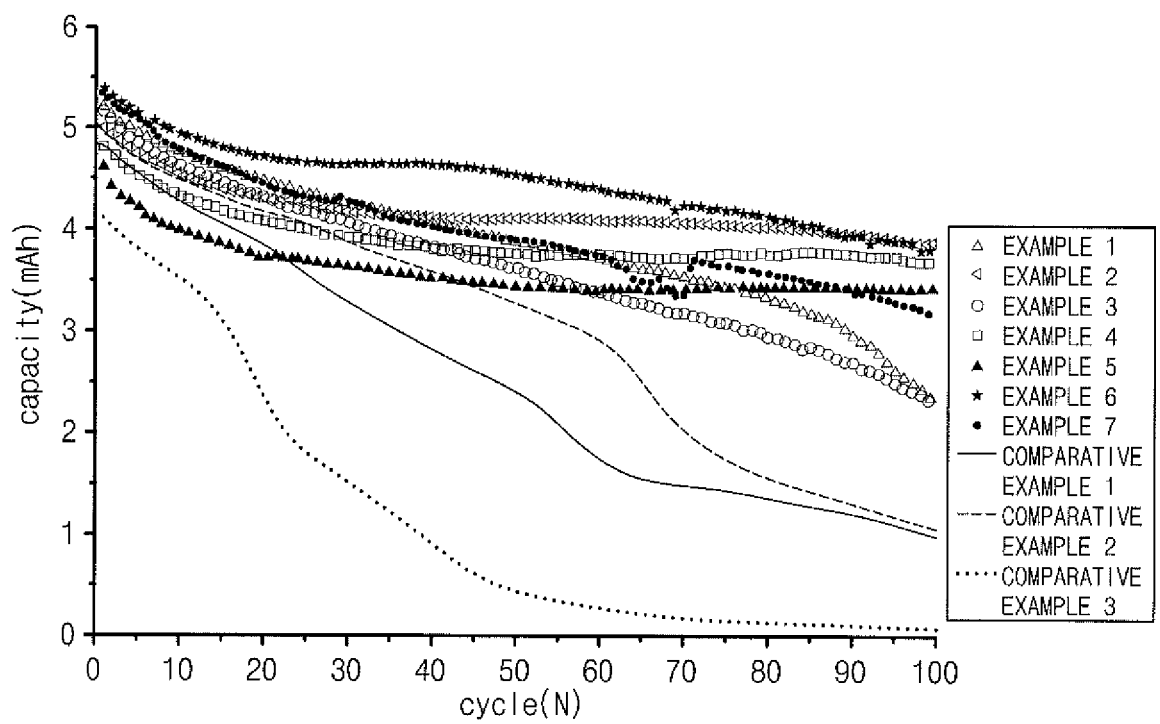

NON-AQUEOUS ELECTROLYTE SOLUTION FOR LITHIUM SECONDARY BATTERY AND LITHIUM SECONDARY BATTERY COMPRISING THE SAME

CROSS-REFERENCE TO RELATED APPLICATIONS

This application claims the benefit of Korean Patent Application No. 10-2015-0150732, filed on Oct. 29, 2015, in the Korean Intellectual Property Office, the disclosure of which is incorporated herein in its entirety by reference.

TECHNICAL FIELD

Technical Field

The present invention relates to a non-aqueous electrolyte solution for a lithium secondary battery and a lithium secondary battery including the same, and more particularly, to a non-aqueous electrolyte solution for a lithium secondary battery, which comprises a compound containing at least two cyano groups (—CN) as an additive, and a lithium secondary battery in which cycle life and high-temperature storage characteristics are improved even at high-voltage charge by including the same.

Background Art

Recently, interests in energy storage technologies have been increasingly grown. In particular, while the application of the energy storage technologies is expanded to mobile phones, camcorders, notebook PCs, and even to electric vehicles, research and efforts for the development of the energy storage technologies have been gradually materialized.

The electrochemical devices have received most attention in the field of energy storage technologies, and there emerges an interest in rechargeable secondary batteries among these electrochemical devices.

Among the currently used secondary batteries, lithium secondary batteries, developed in the early 1990's, are spotlighted because the lithium secondary batteries may have higher operating voltage and significantly higher energy density.

The lithium secondary batteries are composed of a negative electrode which comprises a negative electrode active material formed of such as a carbon material capable of intercalating and deintercalating lithium ions, a positive electrode which comprises a positive electrode active material formed of such as a lithium transition metal oxide, and an electrolyte. Also, the lithium secondary batteries may be categorized into a lithium ion liquid battery (LiLB) using a liquid electrolyte, a lithium ion polymer battery (LiPB) using a gel-type polymer electrolyte, and a lithium polymer battery (LPB) using a solid polymer electrolyte according to the electrolyte used.

With respect to the lithium secondary batteries, capacity may increase as charging potential is raised, but stability may be structurally degraded while accelerating the release of transition metals constituting the positive electrode active material.

In particular, the lithium secondary battery comprising a liquid electrolyte may have limitations in that a battery structure may be deformed due to the generation of gas caused by the oxidation of an organic solvent included in the electrolyte when the battery is generally stored for a long period of time at high temperatures, or fire and explosion may occur due to internal heating caused by overcharging. For example, when a voltage increases during the overcharging, a state of the positive electrode becomes unstable due to the release of excessive lithium ions from the positive electrode, and the decomposition of an electrolyte solution occurs while the positive electrode reacts with the electrolyte solution. Also, since the reaction with the electrolyte solution may increase while lithium is precipitated on a surface of the negative electrode, life characteristics of the secondary battery may consequently not only be reduced, but fire and explosion of the battery may also occur while an internal temperature of the secondary battery rapidly increases.

Recently, as the application range of the lithium secondary batteries has expanded, there is a need to develop a lithium secondary battery which may secure safety even at a high voltage while maintaining excellent cycle life characteristics even in more harsh environments such as a high temperature or low temperature environment and high-voltage charging.

DISCLOSURE OF THE INVENTION

Technical Problem

An aspect of the present invention provides an additive for a non-aqueous electrolyte solution which may suppress electrodeposition of metal ions on a negative electrode by forming a complex with the metal ions dissolved from a positive electrode to form an ionic conductive film.

Another aspect of the present invention provides a non-aqueous electrolyte solution for a lithium secondary battery which may improve overcharge safety of the electrolyte solution by comprising the additive for a non-aqueous electrolyte solution.

Another aspect of the present invention provides a lithium secondary battery in which cycle characteristics and high-temperature storage performance are improved even during high-voltage charging by comprising the above non-aqueous electrolyte solution.

Technical Solution

According to an aspect of the present invention, there is provided an additive for a non-aqueous electrolyte solution which is comprised of a compound containing at least two cyano groups (—CN) represented by Formula 1:

$$NC—(R)_n—CN \qquad \text{[Formula 1]}$$

in Formula 1,

R is a cycloalkylene group having 3 to 6 carbon atoms in which at least one cyano group (—CN) is substituted or unsubstituted, a haloalkylene group having 2 to 5 carbon atoms in which at least one cyano group (—CN) is substituted or unsubstituted, or an alkylene group having 2 to 5 carbon atoms in which at least one cyano group (—CN) is substituted, and n is an integer of 1 to 5.

In this case, the alkylene group having 2 to 5 carbon atoms may be —CH(CN)—R$_1$—CH(CN)— (where R$_1$ is a substituted or unsubstituted alkylene group having 1 to 5 carbon atoms), or —R$_2$—C(CN)$_2$—R$_3$— (where R$_2$ and R$_3$ are alkylene groups having 1 to 3 carbon atoms). 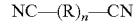

According to another aspect of the present invention, there is provided a non-aqueous electrolyte solution for a lithium secondary battery including an ionizable lithium salt; an organic solvent; and the additive for a non-aqueous electrolyte solution.

According to another aspect of the present invention, there is provided a lithium secondary battery including a negative electrode, a positive electrode, a separator disposed between the negative electrode and the positive electrode, and the non-aqueous electrolyte solution of the present invention.

Advantageous Effects

According to the present invention, since an additive for a non-aqueous electrolyte solution, which may suppress a decomposition reaction of the electrolyte solution by forming a more stable ionic conductive film on the surface of a positive electrode, is provided, an electrolyte solution for a lithium secondary battery, which may suppress the decomposition reaction or may suppress dissolution and movement of metal ions during overcharging, and a lithium secondary battery having improved life characteristics and high-temperature safety at a high voltage may be prepared.

BRIEF DESCRIPTION OF THE DRAWINGS

The FIGURE depicts a graph illustrating experimental results of life characteristics according to Experimental Example 1 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, when the overcharge of a secondary battery occurs, a structure of a positive electrode active material becomes unstable while an excessive amount of lithium ions are discharged from a positive electrode. A decomposition reaction of an electrolyte solution occurs while oxygen is discharged from the positive electrode active material having the unstable structure. Particularly, under a high temperature condition, the dissolution of metal ions from the positive electrode may be increased, and performance of the battery may be degraded when the metal ions are precipitated on a negative electrode.

Thus, an embodiment of the present invention aims at providing an additive for a non-aqueous electrolyte solution which may form a complex with metal ions dissolved from a positive electrode.

Also, the present invention aims at providing a non-aqueous electrolyte solution for a lithium secondary battery which may improve overcharge safety of the electrolyte solution by including the additive for a non-aqueous electrolyte solution.

Furthermore, the present invention aims at providing a lithium secondary battery in which cycle characteristics and high-temperature storage performance are improved even during high-voltage charging by including the above non-aqueous electrolyte solution.

Specifically, an embodiment of the present invention provides an additive for a non-aqueous electrolyte solution which includes a compound containing at least two cyano groups (—CN) represented by the following Formula 1:

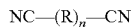   [Formula 1]

in Formula 1,

R is a cycloalkylene group having 3 to 6 carbon atoms in which at least one cyano group (—CN) is substituted or unsubstituted, a haloalkylene group having 2 to 5 carbon atoms in which at least one cyano group (—CN) is substituted or unsubstituted, or an alkylene group having 2 to 5 carbon atoms in which at least one cyano group (—CN) is substituted, and n is an integer of 1 to 5.

In this case, in Formula 1, the alkylene group having 2 to 5 carbon atoms may be —CH(CN)—R$_1$—CH(CN)— (where R$_1$ is a substituted or unsubstituted alkylene group having 1 to 5 carbon atoms), or —R$_2$—C(CN)$_2$—R$_3$— (where R$_2$ and R$_3$ are alkylene groups having 1 to 3 carbon atoms).

Specific examples of the compound represented by Formula 1 may include compounds represented by Formulae 1a to 1g below, but the present invention is not limited thereto.

The additive for a non-aqueous electrolyte solution of the present invention may include at least one of compounds represented by Formulae 1a to 1g below. Among these compounds, the additive for a non-aqueous electrolyte solution may include at least one selected from the group consisting of the compounds represented by Formulae 1c, 1d, and 1e in which three or more nitrile groups are substituted, and, particularly, may include at least one compound selected from the group consisting of the compounds represented by Formulae 1c and 1d.

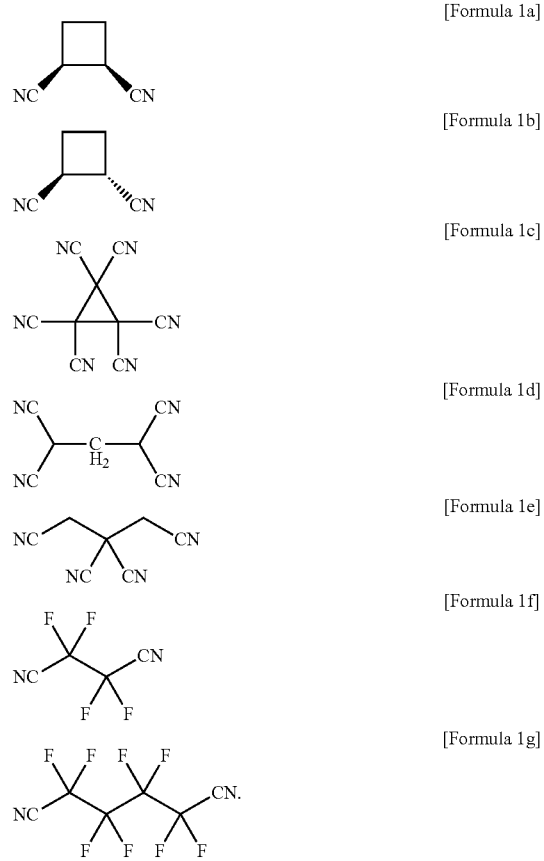

Also, an embodiment of the present invention provides a non-aqueous electrolyte solution for a lithium secondary battery including an ionizable lithium salt; an organic solvent; and an additive for a non-aqueous electrolyte solution, wherein the additive for a non-aqueous electrolyte solution includes the compound represented by Formula 1.

In this case, the additive for a non-aqueous electrolyte solution may be included in an amount of about 0.5 wt % to about 5 wt %, particularly 1 wt % to 5 wt %, based on a total weight of the non-aqueous electrolyte solution. When the amount of the additive is less than 0.5 wt %, stabilizing effect of a solid electrolyte interface (SEI) to be described later is insufficient, and when the amount of the additive is greater than 5 wt %, resistance may be increased due to the cyano group substituted at an end of the compound of Formula 1.

In general, during initial charging of a secondary battery, an SEI film affecting a battery reaction is formed on a surface of a negative electrode (graphite) while an electrolyte solution is decomposed before lithium ions discharged from a positive electrode are inserted into the negative electrode (graphite). The film not only has properties of passing the lithium ions and blocking the movement of electrons, but also plays a role as a protective film which prevents the continuous decomposition of the electrolyte solution. However, performance of the formed SEI film may be difficult to be continuously maintained, and the SEI film may be destroyed by shrinkage and expansion due to repeated charge/discharge cycles or may be destroyed by external impact and heat.

While the SEI film thus destroyed is restored by the continuous charge and discharge process, the charge is additionally or irreversible consumed to result in a continuous decrease in reversible capacity. Particularly, since interface resistance is increased as the thickness of the solid film formed by the decomposition of the electrolyte solution is increased, battery performance is degraded.

However, the compound containing at least two cyano groups (—CN), according to the present invention, may form an ionic conductive film on a surface of the positive electrode when a predetermined voltage is reached during the charging and discharging. Since the ionic conductive film prevents the dispersion of metal ions dissolved from a positive electrode active material, the ionic conductive film suppresses the decomposition reaction of the electrolyte solution by preventing the contact between the positive electrode and the electrolyte solution. Also, the movement of the metal ions dissolved from the positive electrode to the negative electrode may be suppressed by adsorbing the metal ions even in a state in which the film is not formed. Furthermore, since unshared electrons of the cyano group stabilize salt anions, the decomposition of the electrolyte solution may be suppressed. Thus, since the additive for a non-aqueous electrolyte solution may improve safety of the secondary battery during overcharging and may effectively suppress the decomposition reaction of the electrolyte solution even during high-temperature storage, a lithium secondary battery having improved cycle characteristics may be prepared.

In the non-aqueous electrolyte solution of the present invention, the lithium salt, which is included as an electrolyte, may be used without limitation so long as it is typically used in an electrolyte solution for a lithium secondary battery. For example, the lithium salt may include $Li^+$ as a cation, and may include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary. The lithium salt may be appropriately changed in a normally usable range, but may be included in a concentration of 0.8 M to 1.5 M in the electrolyte solution in order to obtain an optimum corrosion protection film formation effect on the surface of the electrode.

Also, the organic solvent included in the non-aqueous electrolyte solution of the present invention may be used without limitation so long as it is typically used in an electrolyte solution for a lithium secondary battery, and, for example, an ether compound, an ester compound, an amide compound, a linear carbonate compound, or a cyclic carbonate compound may be used alone or in a mixture of two or more thereof. Among these compounds, the cyclic carbonate compound, the linear carbonate compound, or a mixture thereof may be typically included.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, cyclic carbonates, such as ethylene carbonate and propylene carbonate, which are known to well dissociate the lithium salt in the electrolyte due to high dielectric constants as highly viscous organic solvents, may be used among the carbonate-based organic solvents. An electrolyte solution having high electrical conductivity may be prepared when the above cyclic carbonate is mixed with low viscosity, low dielectric constant linear carbonate, such as dimethyl carbonate and diethyl carbonate, in an appropriate ratio.

Also, as the ether compound among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound among the organic solvents, any one selected from the group consisting of liner esters such as methyl acetate, ethyl acetate, propyl acetate, methyl propionate, ethyl propionate, propyl propionate, and butyl propionate; and cyclic ester compounds such as γ-butyrolactone, γ-valerolactone, γ-caprolactone, σ-valerolactone, and ε-caprolactone, or a mixture of two or more thereof may be used, but the present invention is not limited thereto.

Also, according to an embodiment of the present invention, there is provided a lithium secondary battery including a positive electrode, a negative electrode, a separator disposed between the positive electrode and the negative electrode, and a non-aqueous electrolyte solution, wherein the above non-aqueous electrolyte solution includes the non-aqueous electrolyte solution of the present invention.

Specifically, the lithium secondary battery of the present invention may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

In this case, the positive electrode may be prepared by coating a positive electrode material mixture including a positive electrode active material, a binder, a conductive agent, and a solvent on a positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of the positive electrode material mixture.

The binder is a component that assists in the binding between the active material and the conductive agent and in the binding with the current collector, wherein the binder is commonly added in an amount of 1 wt % to 30 wt % based on the total weight of the positive electrode material mixture. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the positive electrode material mixture.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, for example, 70 wt % to 90 wt %.

Also, the negative electrode, for example, may be prepared by coating a negative electrode material mixture including a negative electrode active material, a binder, a conductive agent, and a solvent on a negative electrode collector.

The negative electrode collector generally has a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, like the positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides of the metals (Me); and composites of the metals (Me) and carbon.

The negative electrode active material may be included in an amount of 80 wt % to 99 wt % based on a total weight of the negative electrode material mixture.

The binder is a component that assists in the binding between the conductive agent, the active material, and the current collector, wherein the binder is commonly added in an amount of 1 wt % to 30 wt % based on the total weight of the negative electrode material mixture. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is a component for further improving the conductivity of the negative electrode active material, wherein the conductive agent may be added in an amount of 1 wt % to 20 wt % based on the total weight of the negative electrode material mixture. Any conductive agent may be used without particular limitation so long as it has suitable conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include an organic solvent, such as N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 50 wt % to 95 wt %, for example, 70 wt % to 90 wt %.

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, and a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

Fluoroethylene carbonate (FEC), propylene carbonate (PC), and ethylmethyl carbonate (EMC) were mixed in a ratio of 30:10:60 (vol %) to prepare an organic solvent mixed solution. Thereafter, 0.5 wt % of the compound of Formula 1a was further added based on a total weight of the prepared organic solvent mixed solution, and a non-aqueous electrolyte solution was prepared by dissolving $LiPF_6$ in the mixed solution to obtain a $LiPF_6$ concentration of 1 M.

(Positive Electrode Preparation)

40 parts by weight of a mixture, in which a positive electrode active material (lithium cobalt composite oxide ($LiCO_2$)), a conductive agent (carbon black), and a binder (polyvinylidene fluoride (PVDF)) were mixed in a ratio of 90:5:5 (wt %), was added based on 100 parts by weight of N-methyl-2-pyrrolidone (NMP), as a solvent, to prepare a positive electrode material mixture. A 100 μm thick positive electrode collector (Al thin film) was coated with the positive electrode material mixture, dried, and roll-pressed to prepare a positive electrode.

(Negative Electrode Preparation)

80 parts by weight of a mixture, in which natural graphite, a binder (PVDF), and a conductive agent (carbon black) were mixed in a ratio of 95:2:3 (wt %), was added based on 100 parts by weight of N-methyl-2-pyrrolidone (NMP), as a solvent, to prepare a negative electrode material mixture. A 90 μm thick negative electrode collector (Cu thin film) was coated with the negative electrode material mixture, dried, and roll-pressed to prepare a negative electrode.

(Secondary Battery Preparation)

A coin-type cell was prepared by a typical method in which the positive electrode and negative electrode prepared by the above-described method were sequentially stacked with a polyethylene porous film, and a lithium secondary battery (battery capacity 5.5 mAh) was then prepared by injecting the prepared non-aqueous electrolyte solution thereinto.

Example 2

A non-aqueous electrolyte solution and a lithium secondary battery including the same were prepared in the same manner as in Example 1 except that the compound of Formula 1b, instead of the compound of Formula 1a, was included as an additive in the preparation of the non-aqueous electrolyte solution of Example 1.

Example 3

A non-aqueous electrolyte solution and a lithium secondary battery including the same were prepared in the same manner as in Example 1 except that the compound of Formula 1c, instead of the compound of Formula 1a, was included as an additive in the preparation of the non-aqueous electrolyte solution of Example 1.

Example 4

A non-aqueous electrolyte solution and a lithium secondary battery including the same were prepared in the same manner as in Example 1 except that the compound of Formula 1d, instead of the compound of Formula 1a, was included as an additive in the preparation of the non-aqueous electrolyte solution of Example 1.

Example 5

A non-aqueous electrolyte solution and a lithium secondary battery including the same were prepared in the same manner as in Example 1 except that the compound of Formula 1e, instead of the compound of Formula 1a, was included as an additive in the preparation of the non-aqueous electrolyte solution of Example 1.

Example 6

A non-aqueous electrolyte solution and a lithium secondary battery including the same were prepared in the same manner as in Example 1 except that the compound of Formula 1f, instead of the compound of Formula 1a, was included as an additive in the preparation of the non-aqueous electrolyte solution of Example 1.

Example 7

A non-aqueous electrolyte solution and a lithium secondary battery including the same were prepared in the same manner as in Example 1 except that the compound of Formula 1g, instead of the compound of Formula 1a, was included as an additive in the preparation of the non-aqueous electrolyte solution of Example 1.

Comparative Example 1

A non-aqueous electrolyte solution and a lithium secondary battery including the same were prepared in the same manner as in Example 1 except that the compound of Formula 1a was not added as an additive in the preparation of the non-aqueous electrolyte solution in Example 1.

Comparative Example 2

A non-aqueous electrolyte solution and a lithium secondary battery including the same were prepared in the same manner as in Example 1 except that a compound of the following Formula 2a, instead of the compound of Formula 1a, was included as an additive in the preparation of the non-aqueous electrolyte solution of Example 1.

[Formula 2a]

Comparative Example 3

A non-aqueous electrolyte solution and a lithium secondary battery including the same were prepared in the same manner as in Example 1 except that 5.5 wt % of the compound of Formula 1a was included as an additive in the preparation of the non-aqueous electrolyte solution of Example 1.

Comparative Example 4

A non-aqueous electrolyte solution and a lithium secondary battery including the same were prepared in the same manner as in Example 3 except that 5.5 wt % of the compound of Formula 1c was included as an additive in the preparation of the non-aqueous electrolyte solution of Example 3.

Comparative Example 5

A non-aqueous electrolyte solution and a lithium secondary battery including the same were prepared in the same manner as in Example 4 except that 5.5 wt % of the compound of Formula 1d was included as an additive in the preparation of the non-aqueous electrolyte solution of Example 4.

EXPERIMENTAL EXAMPLES

Experimental Example 1: Life Characteristics

The lithium secondary batteries prepared in Examples 1 to 7 and Comparative Examples 1 to 3 were charged at a constant current of 0.7 C to a voltage of 4.35 V at 60° C. Thereafter, the batteries were charged at a constant voltage of 4.35 V and the charge was terminated when a charge current became 0.275 mA. After the batteries were left standing for minutes, the batteries were discharged at a constant current of 0.5 C to a voltage of 3.0 V. The charge and discharge were repeated for 100 cycles and battery capacities were then measured. The results thereof are presented in the FIGURE.

Herein, the expression "C" represents a C-rate, a charge/discharge current rate of a battery expressed by ampere (A), wherein it is typically expressed as a battery capacity ratio. That is, 1 C for the previously prepared batteries means a current of 5.5 mA.

As illustrated in the FIGURE, it may be understood that cycle life characteristics of the batteries of Examples 1 to 7 were better than those of the secondary batteries of Comparative Examples 1 to 3.

Experimental Example 2: Co Ion Electrodeposition Experiment

The lithium secondary batteries prepared in Examples 1 to 7 and Comparative Examples 1 to 5 were charged and discharged in the same manner as in Experimental Example 1, a concentration of Co ions dissolved from the separator of each cell was measured by inductively coupled plasma (ICP) analysis, and comparison results are presented in Table 1 below.

TABLE 1

|  | Formula | Content | Co (ppm) |
| --- | --- | --- | --- |
| Example 1 | 1a | 0.5 wt % | 24 |
| Example 2 | 1b | 0.5 wt % | 27 |
| Example 3 | 1c | 0.5 wt % | 43 |
| Example 4 | 1d | 0.5 wt % | 21 |
| Example 5 | 1e | 0.5 wt % | 34 |
| Example 6 | 1f | 0.5 wt % | 62 |
| Example 7 | 1g | 0.5 wt % | 71 |
| Comparative Example 1 | — | — | 233 |
| Comparative Example 2 | 2a | 0.5 wt % | 167 |
| Comparative Example 3 | 1a | 5.5 wt % | 145 |
| Comparative Example 4 | 1c | 5.5 wt % | 106 |
| Comparative Example 5 | 1d | 5.5 wt % | 111 |

As illustrated in Table 1, it may be understood that the concentrations of the dissolved Co of the secondary batteries of Examples 1 to 7 were low at about 71 ppm or less, but the concentrations of the dissolved Co of the secondary batteries of Comparative Examples 1 to 5 were high at about 106 ppm or more. Thus, it may be predicted that, in a case in which the non-aqueous electrolyte solution of the present invention was used, the dissolution of metal may be suppressed and a stable film may be formed.

Experimental Example 3: Overcharge Safety Measurement

The batteries prepared in Examples 1 to 7 and Comparative Examples 1 to 3 were charged at a 0.8 C rate to 4.35 V under a constant current/constant voltage condition, cut-off charged at 0.05 C, and discharged at 0.5 C to a voltage of 3.0 V.

Next, the batteries were overcharged at 0.8 C to a voltage of 10 V. The battery was evaluated as "OK" only when there were no ignition, explosion, and electrolyte leakage of the battery after the overcharge, the battery was evaluated as "Δ" when there was ignition or electrolyte leakage of some batteries, and the battery was evaluated as "×" when the ignition or electrolyte leakage of the battery was intensified. The results thereof are presented in Table 2 below.

Experimental Example 4: High-Temperature Storage Performance Measurement

The batteries prepared in Examples 1 to 7 and Comparative Examples 1 and 3 were charged at a 0.8 C rate to 4.35 V under a constant current/constant voltage condition, cut-off charged at 0.05 C, and discharged at 0.5 C to a voltage of 3.0 V (initial discharge capacity).

Subsequently, the batteries were charged at a 0.8 C rate to 4.35 V under a constant current/constant voltage condition, cut-off charged at 0.05 C, and stored at 60° C. for 2 weeks. Thereafter, the batteries were discharged at 0.5 C to a voltage of 3.0 V at room temperature and discharge capacities were measured (residual discharge capacities).

Next, the batteries were charged at a 0.8 C rate to 4.35 V under a constant current/constant voltage condition, cut-off charged at 0.05 C, and discharged at 0.5 C to a voltage of 3.0 V to measure discharge capacities, and the results thereof are presented in Table 2 below (recovery discharge capacities).

In this case, the residual discharge capacities and the recovery discharge capacities were expressed as a percentage (%) relative to the initial discharge capacity.

TABLE 2

|  | Overcharge safety | Residual discharge capacity (%) | Recovery discharge capacity (%) |
| --- | --- | --- | --- |
| Example 1 | OK | 80 | 88 |
| Example 2 | OK | 79 | 86 |
| Example 3 | OK | 86 | 97 |
| Example 4 | OK | 84 | 93 |
| Example 5 | OK | 87 | 95 |
| Example 6 | OK | 77 | 86 |
| Example 7 | OK | 75 | 83 |
| Comparative Example 1 | X | 45 | 62 |
| Comparative Example 2 | Δ | 56 | 70 |
| Comparative Example 3 | OK | — | — |

As illustrated in Table 2, it may be understood that the overcharge safety and the residual discharge capacities and recovery discharge capacities at high temperatures of the secondary batteries of Examples 1 to 7 including the non-aqueous electrolyte solutions of the present invention were excellent. In particular, with respect to the secondary batteries of Examples 3 to 5 which include the non-aqueous electrolyte solutions including the additives of Formulae 1c, 1d, and 1e containing three or more nitrile groups, it may be understood that the overcharge safety and the residual discharge capacities and recovery discharge capacities at high temperatures were particularly excellent.

In contrast, it may be confirmed that overcharge safeties of the secondary battery of Comparative Example 1, in which an additive was not used, and the secondary battery of Comparative Example 2, in which the compound of Formula 2a was included as an additive, were worse than those of other batteries.

Also, with respect to the secondary battery of Comparative Example 3, since an excessive amount of the additive of the present invention capable of suppressing the dissolution during the overcharging was included, the overcharge safety may be secured. However, since resistance was increased due to the excessive amount of the additive, it may be confirmed that life performance was degraded as illustrated in the FIGURE.

The invention claimed is:

1. An additive for a non-aqueous electrolyte solution, the additive comprising a compound represented by Formula 1:

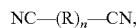 [Formula 1]

NC—(R)$_n$—CN, wherein in Formula 1, R is a cycloalkylene group having 5 carbon atoms, which is substituted with at least one cyano group (—CN); a haloalkylene group having 2 to 5 carbon atoms, which is substituted with at least one cyano group (—CN); or —R$_2$—C(CN)$_2$—R$_3$—, wherein R$_2$ and R$_3$ are each independently an alkylene group having 1 to 3 carbon atoms, and at least one of R$_2$ and R$_3$ is an alkylene group having 1 carbon atom, and n is an integer of 1 to 5.

2. The additive for a non-aqueous electrolyte solution of claim 1, comprising at least one compound selected from the group consisting of compounds represented by Formulae 1e:

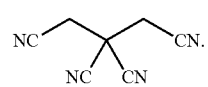 [Formula 1e]

3. A non-aqueous electrolyte solution for a lithium secondary battery, the non-aqueous electrolyte solution comprising:
an ionizable lithium salt;
an organic solvent; and
an additive for a non-aqueous electrolyte solution,
wherein the additive for a non-aqueous electrolyte solution comprises a compound represented by Formula 1:

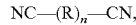 [Formula 1]

NC—(R)$_n$—CN, wherein in Formula 1, R is a cycloalkylene group having 3 to 5 carbon atoms, which is substituted with at least one cyano group (—CN); a haloalkylene group having 2 to 5 carbon atoms, which is substituted with at least one cyano group (—CN); or —R$_2$—C(CN)$_2$—R$_3$—, wherein R$_2$ and R$_3$ are each independently an alkylene group having 1 to 3 carbon atoms, and at least one of R$_2$ and R$_3$ is an alkylene group having 1 carbon atom, and n is an integer of 1 to 5.

4. The non-aqueous electrolyte solution for a lithium secondary battery of claim 3, wherein the additive for a non-aqueous electrolyte solution comprises at least one compound selected from the group consisting of compounds represented by Formulae 1c and 1e:

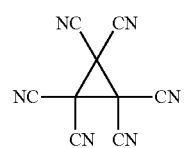 [Formula 1c]

[Formula 1e]

5. The non-aqueous electrolyte solution for a lithium secondary battery of claim 3, wherein the additive for a non-aqueous electrolyte solution is included in an amount of 0.5 wt % to 5 wt % based on a total weight of the non-aqueous electrolyte solution.

6. The non-aqueous electrolyte solution for a lithium secondary battery of claim 3, wherein the lithium salt comprises $Li^+$, as a cation, and any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

7. The non-aqueous electrolyte solution for a lithium secondary battery of claim 3, wherein the organic solvent comprises any one selected from the group consisting of an ether compound, an ester compound, an amide compound, a linear carbonate compound, or a cyclic carbonate compound, or a mixture of two or more thereof.

8. A lithium secondary battery comprising:
a negative electrode;
a positive electrode;
a separator disposed between the negative electrode and the positive electrode; and
a non-aqueous electrolyte solution,
wherein the non-aqueous electrolyte solution comprises the non-aqueous electrolyte solution for a lithium secondary battery of claim 3.

* * * * *